(12) United States Patent
Thörnblom et al.

(10) Patent No.: US 11,727,711 B2
(45) Date of Patent: Aug. 15, 2023

(54) FINGERPRINT SENSING SYSTEM AND METHOD USING THRESHOLDING

(71) Applicant: FINGERPRINT CARDS ANACATUM IP AB, Gothenburg (SE)

(72) Inventors: Hans Thörnblom, Hålta (SE); Daniel Andersson, Gothenburg (SE); Frank Riedijk, Delft (NL); Johannes Arvidsson, Gothenburg (SE); Rasmus Söderström Olsson, Gothenburg (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 18/010,006

(22) PCT Filed: Jun. 23, 2021

(86) PCT No.: PCT/SE2021/050623
§ 371 (c)(1),
(2) Date: Dec. 13, 2022

(87) PCT Pub. No.: WO2022/005369
PCT Pub. Date: Jan. 6, 2022

(65) Prior Publication Data
US 2023/0230410 A1 Jul. 20, 2023

(30) Foreign Application Priority Data
Jul. 3, 2020 (SE) .................... 2050839-6

(51) Int. Cl.
G06V 40/13 (2022.01)
G06V 10/10 (2022.01)

(52) U.S. Cl.
CPC .............. *G06V 40/13* (2022.01); *G06V 10/17* (2022.01)

(58) Field of Classification Search
CPC ......... G06V 40/12; G06V 40/13; G06V 10/17
See application file for complete search history.

(56) References Cited

U.S. PATENT DOCUMENTS

| 9,984,274 B2 | 5/2018 | Ramberg et al. |
| 9,990,529 B2 | 6/2018 | Zhang et al. |
| (Continued) | | |

FOREIGN PATENT DOCUMENTS

| CN | 110286793 A | 9/2019 |
| KR | 20160130747 A | 11/2016 |
| (Continued) | | |

OTHER PUBLICATIONS

International Search Report and Written Opinion for International Application No. PCT/SE2021/050623, dated Sep. 9, 2021.

*Primary Examiner* — Abhishek Sarma
(74) *Attorney, Agent, or Firm* — Westman, Champlin & Koehler, P.A.

(57) ABSTRACT

A fingerprint sensing system for sensing a finger surface of a finger, comprising: an array of sensing elements arranged under a sensing surface, each sensing element in the array of sensing elements being configured to sense a property indicative of a distance between the sensing element and the finger surface; and read-out circuitry coupled to the array of sensing elements and configured to provide, for each sensing element in the array of sensing elements, a timing indication indicative of a time when a value of the property sensed by the sensing element reached a predefined threshold value.

15 Claims, 6 Drawing Sheets

(56) References Cited

U.S. PATENT DOCUMENTS

| | | |
|---|---|---|
| 10,002,280 B1 | 6/2018 | Ramberg et al. |
| 10,372,966 B2 | 8/2019 | Suwald et al. |
| 2016/0307020 A1 | 10/2016 | Zhang et al. |
| 2017/0169278 A1 | 6/2017 | Setterberg et al. |
| 2017/0193209 A1 | 7/2017 | Mohan |
| 2017/0330013 A1 | 11/2017 | Ramberg et al. |
| 2018/0173921 A1* | 6/2018 | Ramberg .............. G06F 3/0443 |
| 2019/0121481 A1 | 4/2019 | Schoenauer et al. |
| 2020/0410191 A1 | 12/2020 | Skovgaard Christensen et al. |

FOREIGN PATENT DOCUMENTS

| | | |
|---|---|---|
| WO | 2017196238 A1 | 11/2017 |
| WO | 2019117783 A1 | 6/2019 |

* cited by examiner

FINGERPRINT SENSING SYSTEM AND METHOD USING THRESHOLDING

CROSS-REFERENCE TO RELATED APPLICATION

This Application is a Section 371 National Stage Application of International Application No. PCT/SE2021/050623, filed Jun. 23, 2021, which claims priority to Swedish Patent Application No. 2050839-6 filed on Jul. 3, 2020, and published as WO 2022/005369 A1 on Jan. 6, 2022, in English, the entire contents of which are hereby incorporated by reference in their entireties.

FIELD OF THE INVENTION

The present invention relates to a fingerprint sensing system, and to a method of forming a representation of a finger using an array of sensing elements.

BACKGROUND OF THE INVENTION

Fingerprint sensing systems are widely used as means for increasing the convenience and security of electronic devices, such as mobile phones etc.

There are many existing fingerprint sensing systems using various sensing techniques to acquire a representation of the fingerprint of a user. Examples of such sensing techniques include capacitive sensing, optical sensing, ultrasonic sensing, and thermal sensing. Although fingerprint sensing systems using these and other various sensing techniques are continuously improved, issues remain to be addressed.

For instance, there may be unsolved issues regarding reliable sensing of particularly wet fingers, and/or regarding the capability to distinguish a real finger from a fake finger (so-called spoof), and/or it would be desirable to provide for more cost-efficient fingerprint sensing systems, in particular for large area sensing.

It would thus be desirable to provide for improved fingerprint sensing in respect of one or more of these remaining issues.

SUMMARY

It is an object of the present invention to provide for improved fingerprint sensing.

According to a first aspect of the present invention, it is therefore provided a fingerprint sensing system for sensing a finger surface of a finger, comprising: an array of sensing elements arranged under a sensing surface, each sensing element in the array of sensing elements being configured to sense a property indicative of a distance between the sensing element and the finger surface; and read-out circuitry coupled to the array of sensing elements and configured to provide, for each sensing element in the array of sensing elements, a timing indication indicative of a time when a value of the property sensed by the sensing element reached a predefined threshold value.

The sensing element may be responsive to a physical property that differs in dependence on the topography of the finger surface. Examples of such physical properties include capacitive coupling, mechanical coupling, thermal coupling, and optical reflection. As is well known to those of ordinary skill in the art, various sensing element configurations exist, that are suitable for sensing these physical properties indicative of the interaction between the finger and the sensing element. In the case of capacitive coupling, the sensing element may, for example, include a conductive plate where charge can be accumulated; in the case of mechanical coupling, the sensing element may, for example, have piezoelectric properties; in the case of thermal coupling, the sensing element may, for example, include a resistor or other circuit element that can be controlled to generate heat; and in the case of optical reflection, the sensing element may, for example, include a photo-diode that generates a photocurrent indicative of an amount of incident light.

It should be noted that the timing indication need not necessarily indicate an absolute time or be in units of time, but that the timing indication may indicate the time in relative terms, such as in the form of an order number in a sequence of events including the events that the value of the property sensed by each sensing element in a group of sensing elements relatively close to each other reaches the predefined threshold value.

The timing indication may, in some suitable way, be related to a starting time of the fingerprint sensing event. For instance, the starting time may be when the presence of a finger has been detected, or any suitable time after the presence of the finger has been detected by the fingerprint sensing system or other finger detection circuitry.

It should be noted that the predefined threshold value may be reached from "below" or from "above". If it is defined that the value of the property sensed by the sensing element increases with shorter distance between the finger surface and the sensing surface, the timing indication may be related to the time when the value of the property sensed by a particular sensing element has increased to reach the threshold value from "below". With the same definition, the timing indication may, as an alternative or complement, be related to removal of the finger from the sensing surface from a fully placed state. In this case, the timing indication may indicate the time when the value of the property sensed by a particular sensing element has decreased to reach the threshold value from "above".

The present invention is based on the realization that the dynamics of a finger placement or finger removal can provide information about the topography of the finger. In particular, the present inventors have realized that an indication of the time when a value of the property sensed by each sensing element reaches a predefined threshold value can be used to deduce the fingerprint pattern as well as, optionally, a macroscopic shape of the finger.

Basing the sensing on the dynamics of the finger placement or finger removal according to embodiments of the present invention provides for several advantages. For wet fingers, the propagation of the finger "front" from the point of initial contact with the sensing surface can be captured using the above-mentioned timing indications to provide finger surface information that may not be distinguishable when the finger fully rests on the sensing surface. Concerning the ability to distinguish real fingers from fake fingers (spoofs), the above-mentioned timing indications may provide information about the mechanical properties of the finger (or spoof) on the scale of the ridges and valleys of the fingerprint pattern, as well as information about the macroscopic shape of the finger, making it considerably more challenging to produce a successful spoof. As for cost-efficiency, embodiments of the present invention provide for a considerably simpler sensor design than for most conventional fingerprint sensors. For instance, simple thresholding (with a small bit depth) may be sufficient to achieve the above-mentioned timing indications, which may require simpler structures in the sensing elements, with coarser features, which may allow for the use of simpler and more cost-efficient processing techniques, and/or provide for increased production yield.

According to various embodiments, the fingerprint sensing system may advantageously comprise counter circuitry coupled to the read-out circuitry and configured to, for each sensing element in the array of sensing elements: count events recurring with a known frequency (period time), from a reference time until the time when the value of the property sensed by the sensing element reaches the predefined threshold value. As will be understood by the skilled person, various measures may be taken to determine when a signal reliably reaches a threshold value. In particular when the signal is noisy, it may be beneficial to continue to compare the signal with the threshold value for a period of time after the signal first reaches the threshold value, and to decide on the time when the signal reliably reached the threshold value based on an evaluation of the comparison results during that period of time.

The events recurring with the known frequency may be clock pulses or any other event, signal or pulse recurring with a known frequency.

The above-mentioned timing indication may be based on, an output from the counter circuitry. For instance, the timing indication may comprise, or be constituted by the output from the counter circuitry, or the timing indication may be an order number as mentioned further above, which may be based on the output from the counter circuitry.

Furthermore, the read-out circuitry may comprise a plurality of comparators, each comparator in the plurality of comparators being coupled to a respective set of sensing elements in the array of sensing elements; and each comparator in the plurality of comparators may be configured to compare the value of the property sensed by each sensing element in its respective set of sensing elements with the predefined threshold value.

Each comparator may be configured to provide an indication for a particular sensing element when that value of the property sensed by that sensing element is higher or lower than the predefined threshold value.

According to embodiments, different sets of of sensing elements may be coupled to each comparator. For instance, the sensing elements in part of or an entire row or column may be coupled to a comparator, or a limited number of sensing elements, such as less than nine or less than four, of mutually adjacent sensing elements may be coupled to a comparator. In some embodiments, which may be suitable for particularly fast read-out, each comparator in the plurality of comparators may be coupled to a single respective sensing element, and configured to compare the value of the property sensed by the single respective sensing element with the predefined threshold value.

According to embodiments, furthermore, each comparator in the plurality of comparators may be configured to output a digital value indicating a result of a comparison performed by the comparator. The digital value may advantageously have a bit depth of two bits or less, to provide for a relatively simple and cost efficient configuration of the comparators.

These embodiments in which the read-out circuitry comprises comparators may advantageously be combined with the above-described embodiments in which the fingerprint sensing system comprises counter circuitry. The counter circuitry may be then be configured to count events recurring with a known frequency, from a reference time until the time when the comparator coupled to the sensing element indicates that the value of the property sensed by the sensing element has reached the predefined threshold value.

For instance, the number of comparisons performed of the value of the property sensed by a particular sensing element may be the timing indication for that sensing element.

According to embodiments, the fingerprint sensing system may further comprise image processing circuitry coupled to the read-out circuitry and configured to form a representation of the finger based on the timing indication for each sensing element in the array of sensing elements.

According to a second aspect of the present invention, it is provided a method of forming a representation of a finger using an array of sensing elements arranged under a sensing surface, each sensing element in the array of sensing elements being configured to sense a property indicative of a distance between the sensing element and the finger surface, the method comprising the steps of: a) comparing a value of the property sensed by each sensing element in the array of sensing elements with a predefined threshold value, each comparison resulting in a first signal representing a first logical value or a second signal representing a second logical value different from the first logical value; b) repeating step a) at a sequence of points in time while the finger is being placed on the sensing surface to get a sequence of logical values for each sensing element in the array of sensing elements; and c) forming the representation of the finger based on the sequence of logical values for each sensing element in the array of sensing elements.

According to various embodiments, step c) may advantageously comprise the steps of: c1) determining, for each sensing element in the array of sensing elements based on the sequence of logical values for each sensing element, a timing indication indicative of a time when a value of the property sensed by the sensing element reached the predefined threshold value; and c2) forming the representation of the finger based on the timing indication for each sensing element in the array of sensing elements.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

Figure 1A:
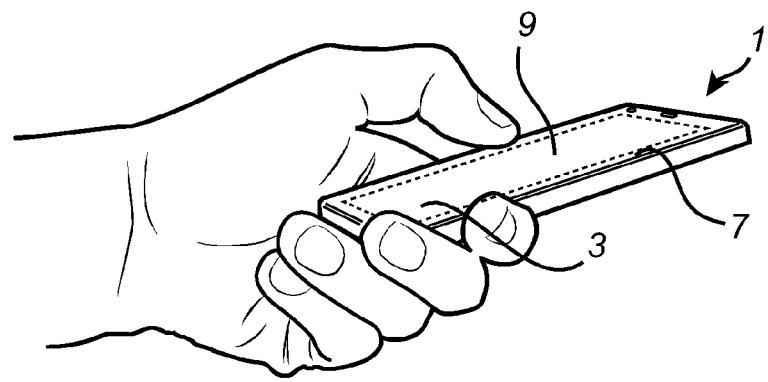
FIG. 1A is an illustration of a first exemplary electronic device comprising a fingerprint sensing system according to an embodiment of the present invention.

FIG. 1A schematically shows a first example embodiment of the electronic device according to the present invention, in the form of a mobile device 1 with an integrated in-display fingerprint sensing system 3 and a display panel 7 with a touch screen interface 9. The fingerprint sensing system 3 may, for example, be used for unlocking the mobile device 1 and/or for authorizing transactions carried out using the mobile device 1, etc.

The fingerprint sensing system 3 is here shown to be smaller than the display panel 7, but still relatively large, e.g. a large area implementation, In another advantageous implementation the fingerprint sensing system 3 may be the same size as the display panel 7, i.e. a full display solution. Thus, in such case the user may place his/her finger anywhere on the display panel for biometric authentication. The fingerprint sensing system 3 may in other possible implementations be smaller than the depicted fingerprint sensing system, such as providing a hot-zone implementation.

Figure 1B:
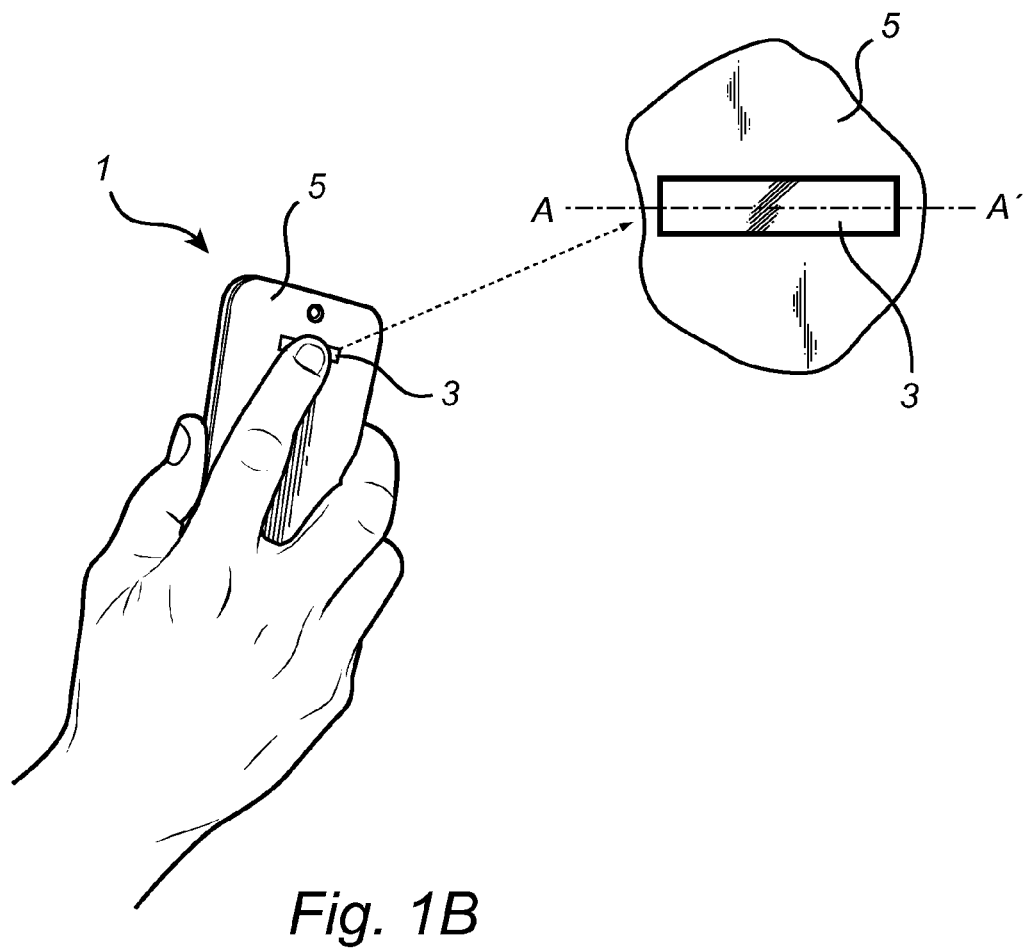
FIG. 1B is an illustration of a second exemplary electronic device comprising a fingerprint sensing system according to an embodiment of the present invention.

FIG. 1B schematically illustrates a second example embodiment of the electronic device according to the present invention, in the form of a mobile device 1 having an integrated fingerprint sensing system 3 being accessible through an opening in the housing 5. The fingerprint sensor 3 may, for example, be used for unlocking the mobile device 1 and/or for authorizing transactions carried out using the mobile device etc.

Figure 2:
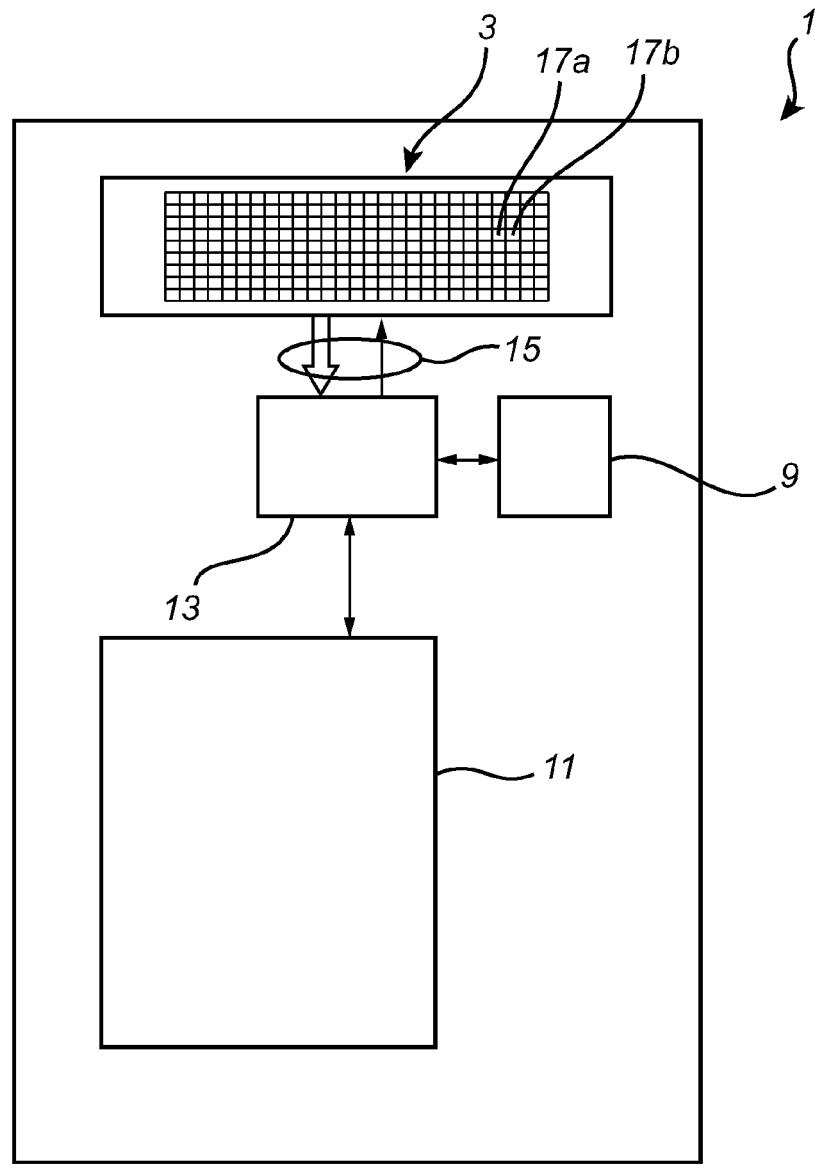
FIG. 2 is a block diagram of the electronic devices in FIGS. 1A-B.

With reference to FIG. 2, which is a schematic block-diagram of the mobile devices 1 in FIGS. 1A-B, the mobile phone 1, in addition to the above-mentioned fingerprint sensing system 3, may comprise communication circuitry 9, user interface circuitry 11, processing circuitry 13, and a fingerprint sensing system interface 15, here schematically indicated by the line arrows indicating control signals and the block arrow indicating data transfer.

As is schematically indicated in FIG. 2, the fingerprint sensing system 3 comprises an array of sensing elements 17a-b (only two neighboring sensing elements are indicated with reference numerals in FIG. 2 to avoid cluttering the drawing). Although not shown in FIG. 2, the fingerprint sensing device 3 additionally comprises read-out circuitry coupled to the array of sensing elements 17a-b and configured to provide, for each sensing element in the array of sensing elements, a timing indication indicative of a time when a value of the property sensed by the sensing element reached a predefined threshold value.

The above-mentioned communication circuitry 9 may, for example, comprise one or several of various antennas and control units for wireless communication, and the above-mentioned user interface circuitry 11 may, for example, comprise one or several of a display, a microphone, a speaker, and a vibration unit.

It should furthermore be noted that the invention may be applicable in relation to other types of electronic devices, such as smart cards, smart watches, laptops, tablet computers, etc.

Figure 3A:
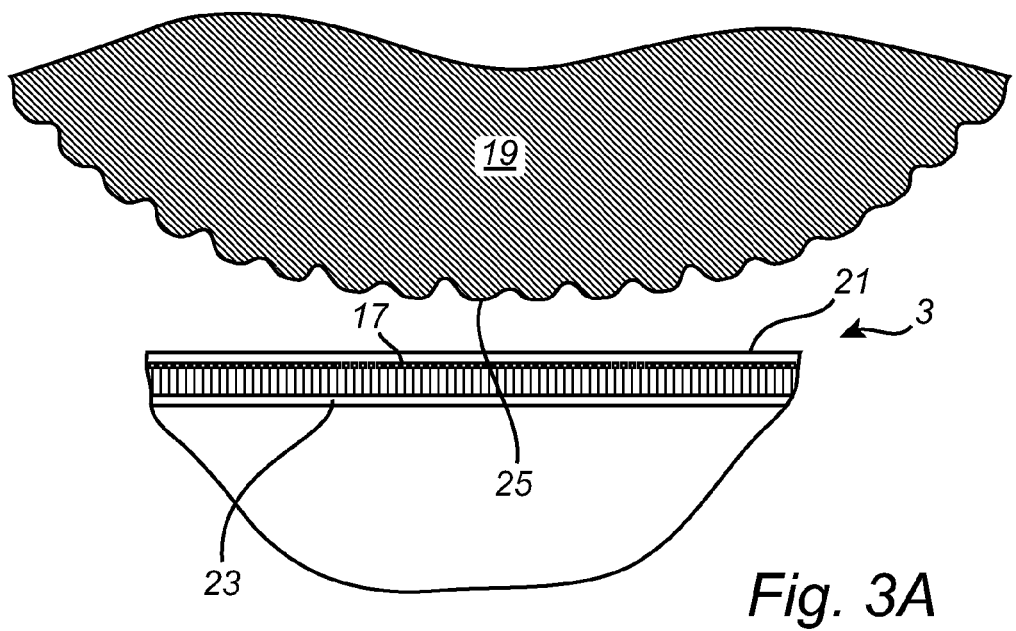
FIGS. 3A-C schematically illustrate a finger touching down on the sensing surface of the fingerprint sensing system in FIG. 1A and FIG. 1B.
Figure 3B:
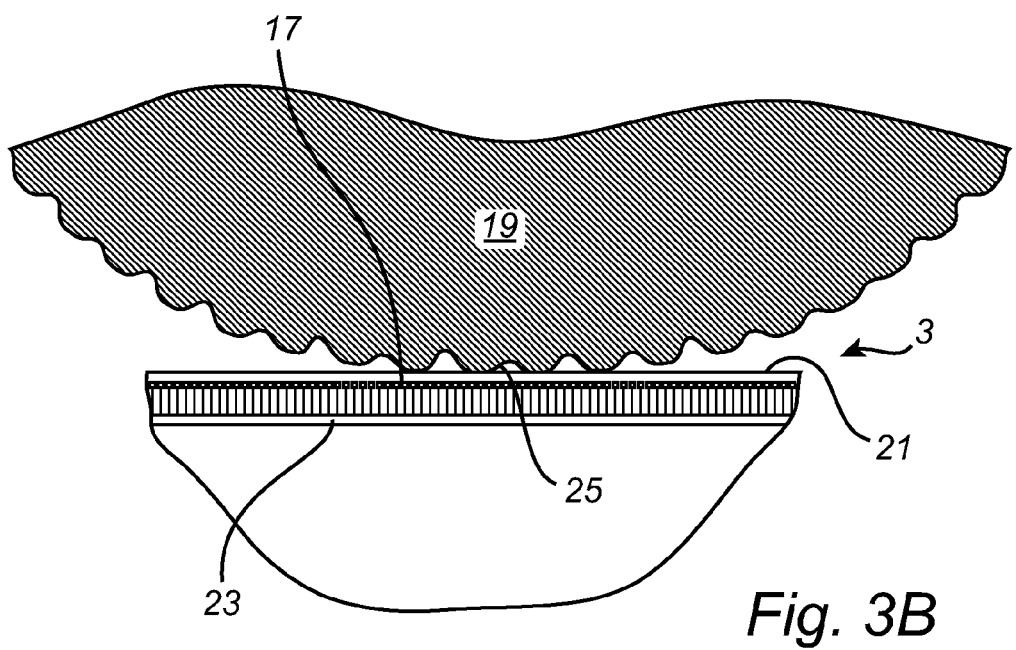
Figure 3C:
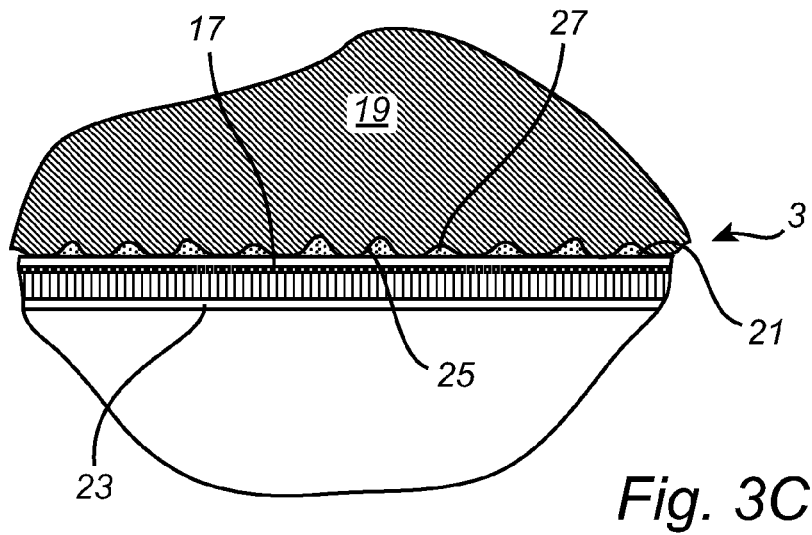

FIGS. 3A-C schematically illustrate a finger 19 touching down on the sensing surface 21 of the fingerprint sensing system 3 in FIG. 1A and FIG. 1B.

In FIGS. 3A-C, a portion of the fingerprint sensing system 3 is shown in a conceptual cross-section view, which may be taken along the line A-A' in FIG. 1B. The sensing elements 17 are indicated by simple boxes, and the read-out circuitry 23 that is connected to each sensing element 17 is indicated by an elongated box running along the length of the cross-section portion of fingerprint sensing system 3 in FIGS. 3A-C. Each sensing element 17 is configured to sense a property indicative of a distance between the sensing element 17 and the surface 25 of the finger 19 facing the sensing surface 21 of the fingerprint sensing system 3. As was also mentioned further above, it should be noted that this property may be different in different implementations, and that different properties are sensed by differently configured sensing elements 17. This is, per se, well known to the person skilled in the art of fingerprint sensing systems. The same may typically apply to the read-out circuitry 23, which may be differently configured to interface with differently configured sensing elements 17.

In FIG. 3A, the surface 25 of the finger 19 has not yet made contact with the sensing surface 21, which means that the finger 19 is still undeformed. Typically, as is somewhat exaggerated in FIG. 3A, a central portion of the fingerprint surface 25 will first make contact with the sensing surface 21, and the area of contact between the finger surface 25 and the sensing surface 21 will then expand from the central portion towards the periphery of the fingerprint surface 25.

In FIG. 3B, the central portion of the fingerprint surface 25 has just started to make contact with the sensing surface 21, and in FIG. 3C, the finger placement is complete and the finger 19 is pressed against the fingerprint sensing surface 21, so that the ridges of the fingerprint pattern are somewhat compressed, in a per se known manner.

For situations or individuals where the finger 19 is moist, the situation after completion of the finger placement may be that the spaces between the valleys of the fingerprint pattern and the sensing surface 21 are partly or completely filled with moisture, indicated by reference numeral 27 in FIG. 3C.

For some fingerprint sensing techniques, a fingerprint image acquired in FIG. 3C may substantially lack image dynamics, making biometric processing of the fingerprint image impossible or at least unreliable. Such fingerprint sensing techniques may include, at least, capacitive fingerprint sensing and optical fingerprint sensing.

Through embodiments of the present invention, this situation can be mitigated, and high quality fingerprint representations of moist fingers can be obtained, even using, for example, capacitive fingerprint sensing or optical fingerprint sensing.

Figure 4A:
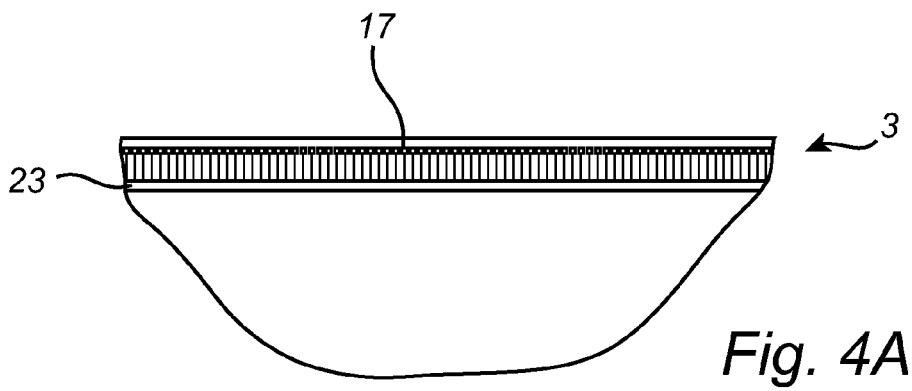
FIGS. 4A-B schematically illustrate the times when the values of the sensed property reached the threshold value for the sensing elements in a row of the fingerprint sensing system during the finger placement indicated in FIGS. 3A-C.
Figure 4B:
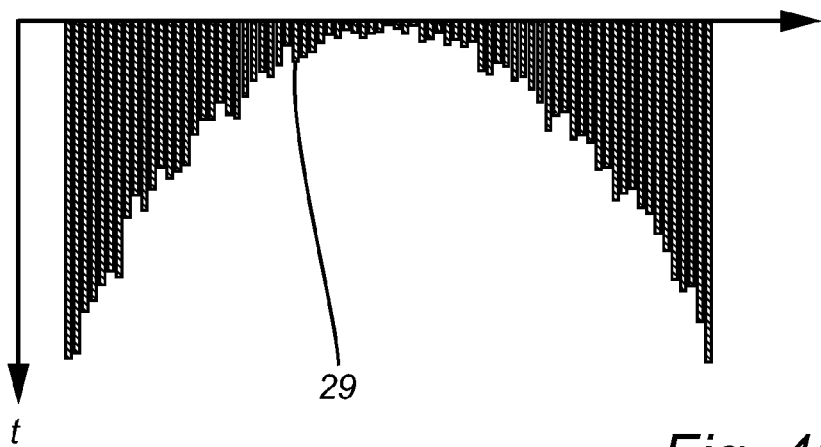

FIGS. 4A-B schematically illustrate the times when the values of the sensed property reached the threshold value for the sensing elements in a row of the fingerprint sensing system during the finger placement indicated in FIGS. 3A-C.

FIG. 4A corresponds to the illustration of the fingerprint sensing system 3 in FIG. 3A-C, and FIG. 4B is a diagram with bars 29 schematically indicating times when the values of the property sensed by the sensing elements 17 aligned with the bars 29 reached the predefined threshold value, starting from initiation of the finger placement.

As can be understood from FIGS. 4A-B, in combination with FIGS. 3A-C, the times (the lengths of the bars 29) in FIG. 4B correspond to the propagation of a border between a contact area, where (the ridges of) the fingerprint surface 25 has made contact with the sensing surface 21, and a non-contact area, where the fingerprint surface 25 has not yet made contact with the sensing surface 21.

The time when the value of the property sensed by a particular sensing element 17 reached the predefined threshold value depends on the topography of the finger surface 25 approaching the sensing surface 21 above that sensing element 17. If the peak of a fingerprint ridge first approaches the sensing element 17, the time for that sensing element 17 will be shorter than if another part of the fingerprint ridge, or the valley, approaches the sensing element 17 first. Hereby, the different times, represented by the bars 29 in FIG. 4B, can provide information about the fingerprint topography obtained at the above-mentioned moving border between the contact area and the non-contact area. This means that the timing indications in FIG. 4B can constitute, or be used as a basis for determining, a representation of the finger, which is based on observations made before the valleys are completely or partly filled with moisture as is schematically indicated in FIG. 3C.

Accordingly, embodiments of the present invention provide for the determination of a useful fingerprint representation of a very moist finger, even if capacitive or optical sensing is used.

As can be understood from the large-scale variation in the lengths of the bars 29 in FIG. 4B—shorter for the central portion of the finger 19 and longer towards the periphery of the finger 19—embodiments of the present invention may also provide valuable information about the macroscopic shape of the finger and/or the deformation behavior of the finger 19. Such properties may be valuable for successfully distinguishing a real finger from a fake finger (spoof), which in turn provides for an improved fingerprint sensing system 3 with improved security.

Figure 5A:
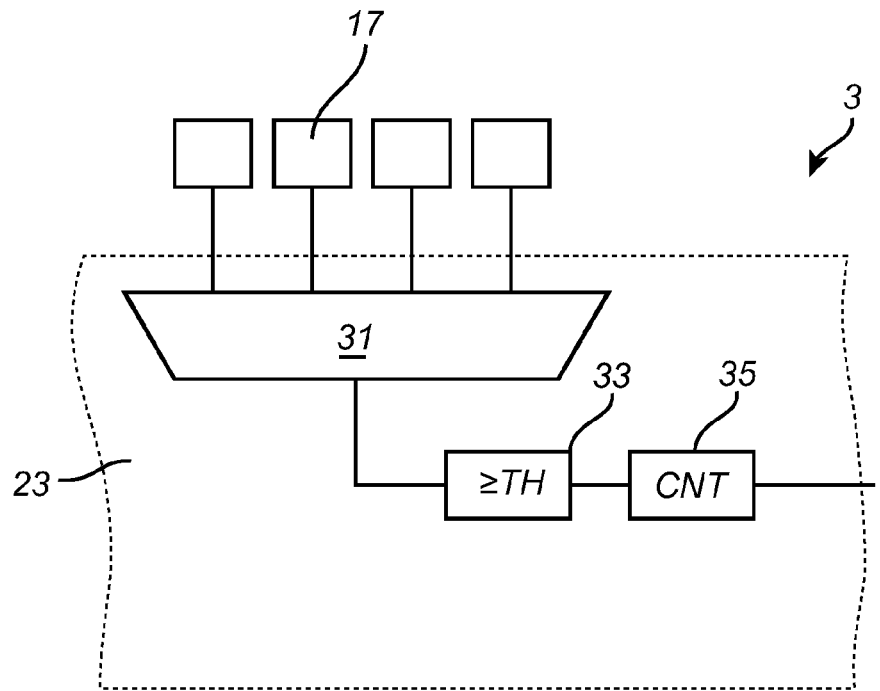
FIG. 5A is a schematic block diagram of a portion a fingerprint sensing system according to a first example embodiment of the invention.

FIG. 5A is a schematic block diagram of a portion of a fingerprint sensing system 3 according to a first example embodiment of the invention. FIG. 5A schematically shows only four of the sensing elements 17 in the fingerprint sensing system, and the portion of the read-out circuitry 23 coupled to those sensing elements 17. It should be understood that the remaining sensing elements 17 in the fingerprint sensing system 3 may be coupled to the read-out circuitry in the representative manner illustrated in FIG. 5A. The four sensing elements 17 in FIG. 5A may, for example, be arranged in the same row or column, or be arranged in a square configuration, or in any other suitable configuration.

Referring to FIG. 5A, the read-out circuitry 23 comprises a plurality of scanners 31 (only one of these is shown in FIG. 5A), a plurality of comparators 33 (only one of these is shown in FIG. 5A), and counter circuitry 35 (only one of these is shown in FIG. 5A).

In FIG. 5A, each comparator 33 is coupled to a respective set of sensing elements 17 in the array of sensing elements, via the respective scanners 31. Each comparator 33 is configured to compare the value of the property sensed by the sensing elements 17 in its respective set with the predefined threshold value TH.

Each comparator 33 may be configured to output a digital value indicating a result of a comparison performed by the comparator 33. This digital value may advantageously have a bit depth of 2 bits or less. This allows for a simple configuration of the comparators 33, considerably simpler than an 8-bit A/D-converter, as is typically used in existing fingerprint sensing systems.

The counter circuitry 35 may be configured to, for each sensing element 17 in the array of sensing elements in the fingerprint sensing system 3, count events recurring with a known frequency, from a reference time until the time when the comparator 33 coupled to the sensing element 17 indicates that the value of the property sensed by the sensing element has reached the predefined threshold value TH. The output of the counter circuitry 35 may correspond to the timing indication for each sensing element 17, as represented by the bars 29 in FIG. 4B.

For instance, the counter circuitry 35 may be configured to, for each sensing element in the array of sensing elements, count the number of comparisons performed for the sensing element 17. Alternatively, the counter circuitry may simply count the time (such as number of clock cycles) from a reference point in time until the value of the property sensed by the sensing element 17 reaches the threshold value TH.

Figure 5B:
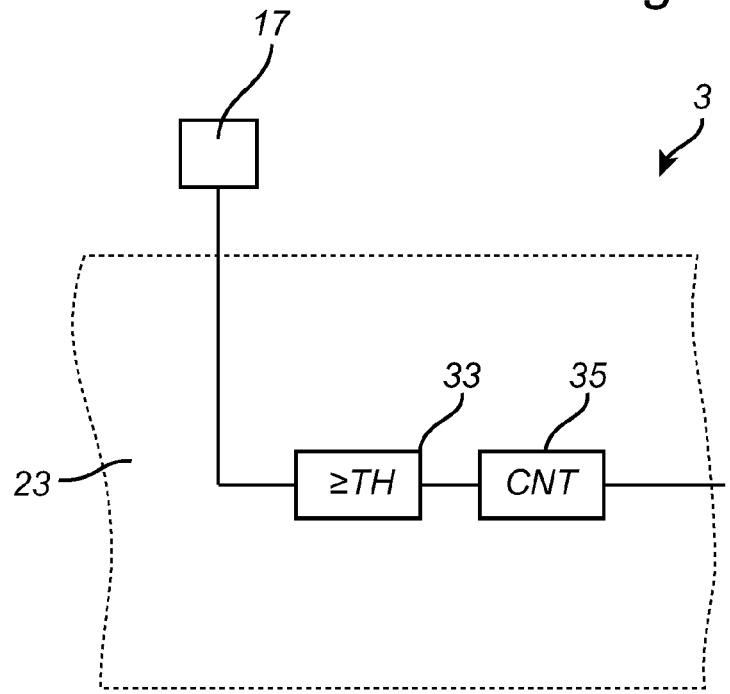
FIG. 5B is a schematic block diagram of a portion a fingerprint sensing system according to a second example embodiment of the invention.

FIG. 5B is a schematic block diagram of a portion of a fingerprint sensing system 3 according to a second example embodiment of the invention. FIG. 5B schematically shows only one of the sensing elements 17 in the fingerprint sensing system, and the portion of the read-out circuitry 23 coupled to this sensing element 17. It should be understood that the remaining sensing elements 17 in the fingerprint sensing system 3 may be coupled to the read-out circuitry in the representative manner illustrated in FIG. 5B.

In FIG. 5B, each comparator 33 is coupled to a respective one of the sensing elements 17 in the array of sensing elements. Each comparator 33 is configured to compare the value of the property sensed by the sensing element 17 in its respective set with the predefined threshold value TH.

Through the configuration in FIG. 5B, with a comparator 33 for each sensing element 17, the read-out speed may be increased, which may translate to increased sensitivity, and/or simpler circuitry may be used.

Two representative example configurations of the read-out circuitry 23 have now been described with reference to FIGS. 5A-B. It should be understood that many other configurations can be realized by the skilled person, without undue burden, based on this description, and the knowledge and capabilities of the skilled person.

Figure 6:
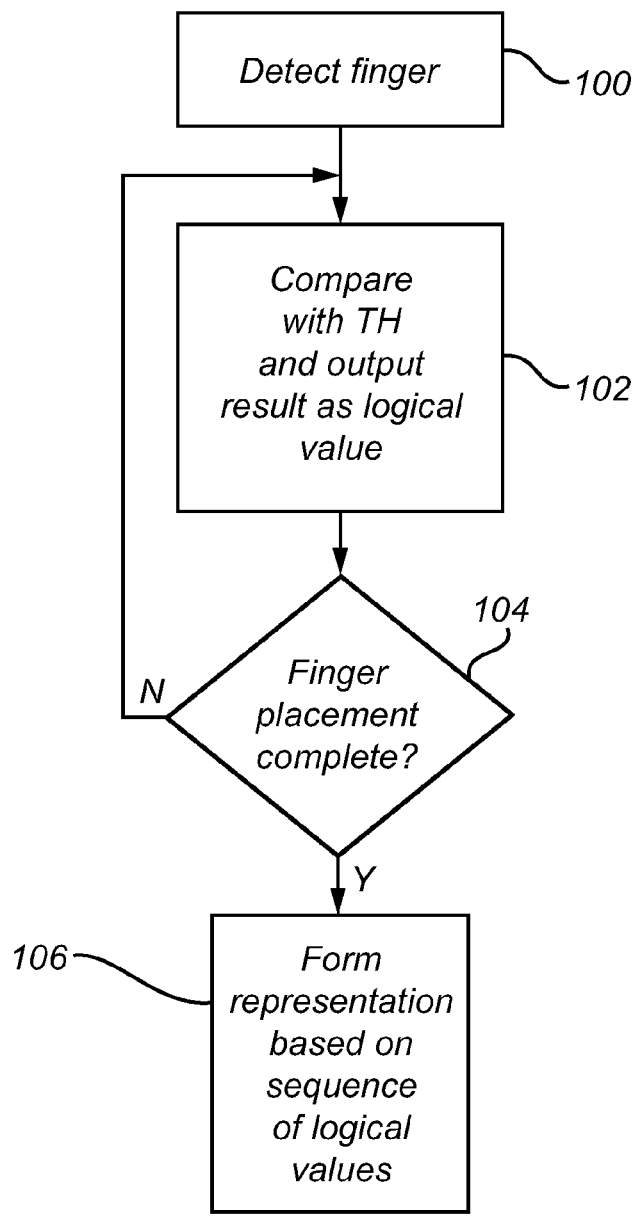
FIG. 6 is a flow-chart illustrating an example embodiment of the method according to the present invention.

Referring to the flow-chart in FIG. 6, an example embodiment of the method according to the present invention will now be described.

In a first step 100, a finger 19 approaching the sensing surface 21 of the fingerprint sensing system 3 is detected. Thereafter, in step 102, a value of the property sensed by each sensing element 17 in the array of sensing elements is compared with a predefined threshold value TH. Each of these comparisons (one for each sensing element 17) results in a first signal representing a first logical value, or a second signal representing a second logical value different from the first logical value. For instance, the first logical value may indicate that the sensed value has not reached the threshold value TH, and the second logical value may indicate that the sensed value has reached the threshold value TH.

In the subsequent step 104, it is determined if the finger placement is complete or not. If it is determined that the finger placement is not yet complete, the method returns to step 102. If it is determined that the finger placement is complete, the method instead proceeds to step 106. The criterion or criteria for determining if the finger placement is complete may be related to a portion of the array of sensing elements 17 that have reached the threshold value TH, and/or may be based on a predefined time from detecting the presence of a finger.

In step 106, a representation of the finger 19 is formed based on the sequence of logical values for each sensing element 17 in the array of sensing elements. It should be noted that the sequence of logical values may be laid out in various different ways, as long as it is possible to translate the sequence of logical values to a timing indication, which may directly indicate a time or a relative timing indicating in which order the values sensed by different sensing elements 17 reach the threshold value TH.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A fingerprint sensing system for sensing a finger surface of a finger, comprising:
   an array of sensing elements arranged under a sensing surface, each sensing element in the array of sensing elements being configured to sense a property indicative of a distance between the sensing element and the finger surface; and
   read-out circuitry coupled to the array of sensing elements and configured to provide, for each sensing element in the array of sensing elements, a timing indication indicative of a time when a value of the property sensed by the sensing element reached a predefined threshold value.

2. The fingerprint sensing system according to claim 1, wherein the fingerprint sensing system comprises counter circuitry coupled to the read-out circuitry and configured to, for each sensing element in the array of sensing elements:
   count events recurring with a known frequency, from a reference time until the time when the value of the property sensed by the sensing element reaches the predefined threshold value.

3. The fingerprint sensing system according to claim 1, wherein:
   the read-out circuitry comprises a plurality of comparators, each comparator in the plurality of comparators being coupled to a respective set of sensing elements in the array of sensing elements; and
   each comparator in the plurality of comparators is configured to compare the value of the property sensed by each sensing element in its respective set of sensing elements with the predefined threshold value.

4. The fingerprint sensing system according to claim 3, wherein the respective set of sensing elements coupled to each comparator in the plurality of comparators includes a plurality of sensing elements arranged in a row or a column of the array of sensing elements.

5. The fingerprint sensing system according to claim 3, wherein the respective set of sensing elements coupled to each comparator in the plurality of comparators includes eight or fewer sensing elements.

6. The fingerprint sensing system according to claim 5, wherein each comparator in the plurality of comparators is coupled to a single respective sensing element, and configured to compare the value of the property sensed by the single respective sensing element with the predefined threshold value.

7. The fingerprint sensing system according to claim 3, wherein each comparator in the plurality of comparators is configured to output a digital value indicating a result of a comparison performed by the comparator.

8. The fingerprint sensing system according to claim 3, wherein the fingerprint sensing system comprises counter circuitry coupled to each comparator in the plurality of comparators, and configured to, for each sensing element in the array of sensing elements:
   count events recurring with a known frequency, from a reference time until the time when the comparator coupled to the sensing element indicates that the value of the property sensed by the sensing element has reached the predefined threshold value.

9. The fingerprint sensing system according to claim 8, wherein the counter circuitry is configured to, for each sensing element in the array of sensing elements, count comparisons performed for the sensing element.

10. The fingerprint sensing system according to claim 1, wherein each sensing element in the array of sensing elements is configured to sense an amount of light incident on the sensing element, or an amount of charge carried by the sensing element, or an amount of heat transferred from or to the sensing element, or a mechanical deformation of the sensing element.

11. The fingerprint sensing system according to claim 1, wherein the fingerprint sensing system further comprises:
    image processing circuitry coupled to the read-out circuitry and configured to form a representation of the finger based on the timing indication for each sensing element in the array of sensing elements.

12. The fingerprint sensing system according to claim 11, wherein the representation of the finger is indicative of a fingerprint pattern of the finger and of a macroscopic shape of the finger.

13. An electronic device comprising:
    a fingerprint sensing system according to claim 1; and
    processing circuitry configured to control operation of the fingerprint sensing system.

14. A method of forming a representation of a finger using an array of sensing elements arranged under a sensing surface, each sensing element in the array of sensing elements being configured to sense a property indicative of a distance between the sensing element and the finger surface, the method comprising the steps of:
    a) comparing a value of the property sensed by each sensing element in the array of sensing elements with a predefined threshold value, each comparison resulting in a first signal representing a first logical value or a second signal representing a second logical value different from the first logical value;
    b) repeating step a) at a sequence of points in time while the finger is being placed on the sensing surface to get a sequence of logical values for each sensing element in the array of sensing elements; and
    c) forming the representation of the finger based on the sequence of logical values for each sensing element in the array of sensing elements.

15. The method according to claim 14, wherein step c) comprises the steps of:
    c1) determining, for each sensing element in the array of sensing elements based on the sequence of logical values for each sensing element, a timing indication indicative of a time when a value of the property sensed by the sensing element reached the predefined threshold value; and
    c2) forming the representation of the finger based on the timing indication for each sensing element in the array of sensing elements.

* * * * *